United States Patent [19]

McMichael

[11] Patent Number: 4,721,285
[45] Date of Patent: Jan. 26, 1988

[54] CABLE DRIVE SYSTEM INCLUDING APPARATUS FOR CONTROLLING NORMAL FORCE APPLIED TO CABLE

[76] Inventor: Robert G. McMichael, 8617 Piney Branch Rd., Apt. 2, Silver Spring, Md. 20901

[21] Appl. No.: 910,608

[22] Filed: Sep. 23, 1986

[51] Int. Cl.⁴ .................. B01D 17/04; B65H 20/00
[52] U.S. Cl. ........................ 254/333; 226/175; 226/186; 254/134.3 SC; 254/266; 254/393
[58] Field of Search ............... 254/333, 371, 374, 382, 254/266, 134.3 SC, 393; 226/175, 186, 199; 242/47.01, 72 B

[56] References Cited

U.S. PATENT DOCUMENTS

| | | | |
|---|---|---|---|
| 3,143,309 | 8/1964 | Clarke | 254/134.3 SC X |
| 3,570,814 | 3/1971 | Zuppiger | 242/47.01 X |
| 3,843,094 | 10/1974 | Watts | 254/333 |

FOREIGN PATENT DOCUMENTS

| | | | |
|---|---|---|---|
| 527616 | 7/1956 | Canada | 226/186 |
| 801432 | 11/1950 | Fed. Rep. of Germany | 242/47.01 |
| 1089831 | 9/1960 | Fed. Rep. of Germany | 254/134.3 SC |
| 846469 | 8/1960 | United Kingdom | 254/134.3 SC |

OTHER PUBLICATIONS

Dimensional and Technical Information for the Airflex EB and ER Element Assemblies and Applications, Eaton Corp., 12/1973.

Primary Examiner—Stuart S. Levy
Assistant Examiner—Katherine Matecki

[57] ABSTRACT

A cable drive system for driving a cable includes a rotatable inflatable member. Sets of guide rollers are positioned about the periphery of the inflatable member, and each of the sets of rollers includes at least two rollers for guiding the cable to maintain the cable substantially in contact with the inflatable member, and to cause the cable to be wound helically about the inflatable member. A fluid supply is used to inflate or deflate the inflatable member to vary the normal force applied to the cable. The inflatable member may be similar to an automobile tire and supported on a wheel through which the inflatable member is rotatably driven. During deployment or retrieval of the cable, the frictional drive force on the cable can be controllably varied by inflating or deflating the inflatable member to vary the normal force applied to the cable. Since the frictional drive force is equal to the product of the normal force and the coefficient of friction, the normal force can be varied to take into account desired changes in the frictional drive force or changes in the coefficient of friction.

27 Claims, 8 Drawing Figures

CABLE DRIVE SYSTEM INCLUDING APPARATUS FOR CONTROLLING NORMAL FORCE APPLIED TO CABLE

BACKGROUND OF THE INVENTION

1. Field of the Invention

This invention relates to a system for driving a cable and particularly to a system for controlling the normal force applied to a cable as it is being retrieved or deployed.

2. The Prior Art

There are a number of systems currently available for use in driving (i.e., deploying or retrieving) a cable. Certain prior art systems are designed for winding and unwinding electrical cables, and particularly electrical cables used in so-called "towed array" systems. In a towed array system, a set of transducers (e.g., hydrophones) are deployed from a ship to conduct sensing operations (e.g., for military purposes or for oil exploration). A typical towed array system includes a heavy wire cable and a set of transducers electrically connected to the heavy wire cable. Typically, electronics for processing the sensor signals are housed in small cans which are electrically connected to the heavy wire cable. Thus, the cable in a towed array includes a heavy wire cable and relatively fragile electronic equipment housed in small cans. Usually, the cans are enclosed within a hose which is coupled to the heavy wire cable via a metal coupling.

One type of system which is currently available for retrieving and deploying a cable includes a grooved capstan drum and metal pressure rollers for applying a normal force to the cable in order to produce a friction drive force when deploying the cable. The load on the metal pressure rollers is provided by a rubber bushing which acts as a nonlinear torsion spring. For a towed array cable, the applied normal force is the same for the heavy wire cable and the array but rises rapidly at the interface between the hose (housing the electronic cans) and the coupling. Several wraps of the cable are guided in a helical path about the grooved capstan drum by grooved rollers which are spring loaded radially toward the drum to provide the normal force for the frictional drive of the cable when the cable is retrieved.

A second type of cable drive system employs fixed axis urethane grooved rollers and a smooth drum to apply the normal force required for the frictional drive of the cable while deploying and retrieving the cable. The location of the rollers relative to the drum surface and the compliance of the roller and cable material provide the normal force. This force is constant for a given diameter cable, but rises rapidly at the interfaces between the cable and the couplings and drops rapidly with a slight decrease in the diameter of the cable.

One disadvantage of the above-described prior art systems is that they both apply a constant force to a cable of a given diameter. In most operations where the systems are used, a lighter force could be used on the portions of the cable containing fragile electronic equipment during retrieval because the drag is low. In contrast, when retrieving the heavy wire cable portion of the cable (which is generally more rugged) higher forces on the cable can be used because a greater amount of drag can be expected. The above prior art systems compromise on these optimum high and low normal forces by providing a constant normal force which is suitable for driving all portions of the cable.

Another disadvantage of the above systems is that when a coupling (which is a rigid metal tube of predetermined length) engages the drum in either of the above systems, the interface of the cable and the coupling is subjected to a bend radius which is considerably smaller than the drum radius. This interface bending also occurs between the drum radius and the smaller bend radius as the coupling engages each pressure roller. The amplitude and frequency of bending depend upon the coupling length and roller spacing.

As a result of the constant normal force which is applied in both of the above-described prior art systems, failures may occur because the fragile electronics present in the hose portion of the cable may break if a large normal force is applied to this portion of the cable, and because the cable may be broken at one or more of the interfaces between the cable and the coupling due to the above-described bending radius. In addition, the above-described second prior art system may produce a failure if the cable cold flows while stored on the drum. This is because stress relaxation will reduce the normal force to zero, thereby reducing the frictional drive force to zero. As a result, when it is desired to restart the system to again drive the cable, there will be no frictional drive force to drive the cable.

In summary, there is a need in the art for a cable drive system which is capable of providing a sufficient normal force to drive the cable at all times but without providing a force which will damage fragile components or coupled portions of the cable.

SUMMARY OF THE INVENTION

It is an object of the present invention to provide a cable drive system which overcomes the above-described disadvantages of prior art cable drive systems.

In particular, it is an object of the present invention to provide a cable drive system having a controllably variable normal force applied to the cable.

The cable drive system of the present invention includes variable diameter support means for supporting the cable to be driven, and guide means for guiding the cable so that it is maintained substantially in contact with the variable support means. The cable drive system of the present invention also includes means for varying the diameter of the variable diameter support means so as to controllably vary the normal force applied to the cable.

In the preferred embodiment, the variable diameter support means is an inflatable member and the means for varying the diameter of the variable diameter support means is a means for inflating and deflating the inflatable member to vary the normal force applied to the cable.

The cable drive system of the present invention has a number of unique features and advantages. By varying the normal force applied to the cable, the normal force can be selected to suit the particular application and to control the force applied to fragile portions of the cable. The variable normal force can be produced by using any type of fluid pressure (e.g., hydraulic or pneumatic) and can be used to adapt to variations in cable diameter. Further, the normal force can be varied to account for changes in the coefficient of friction of the cable jacket (e.g., due to environmental conditions such as a layer of oil on the cable) so that the frictional drive force can be maintained. In addition, flexing at interfaces between the cable and rigid couplings is reduced since the couplings will be depressed into the inflatable member.

These together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
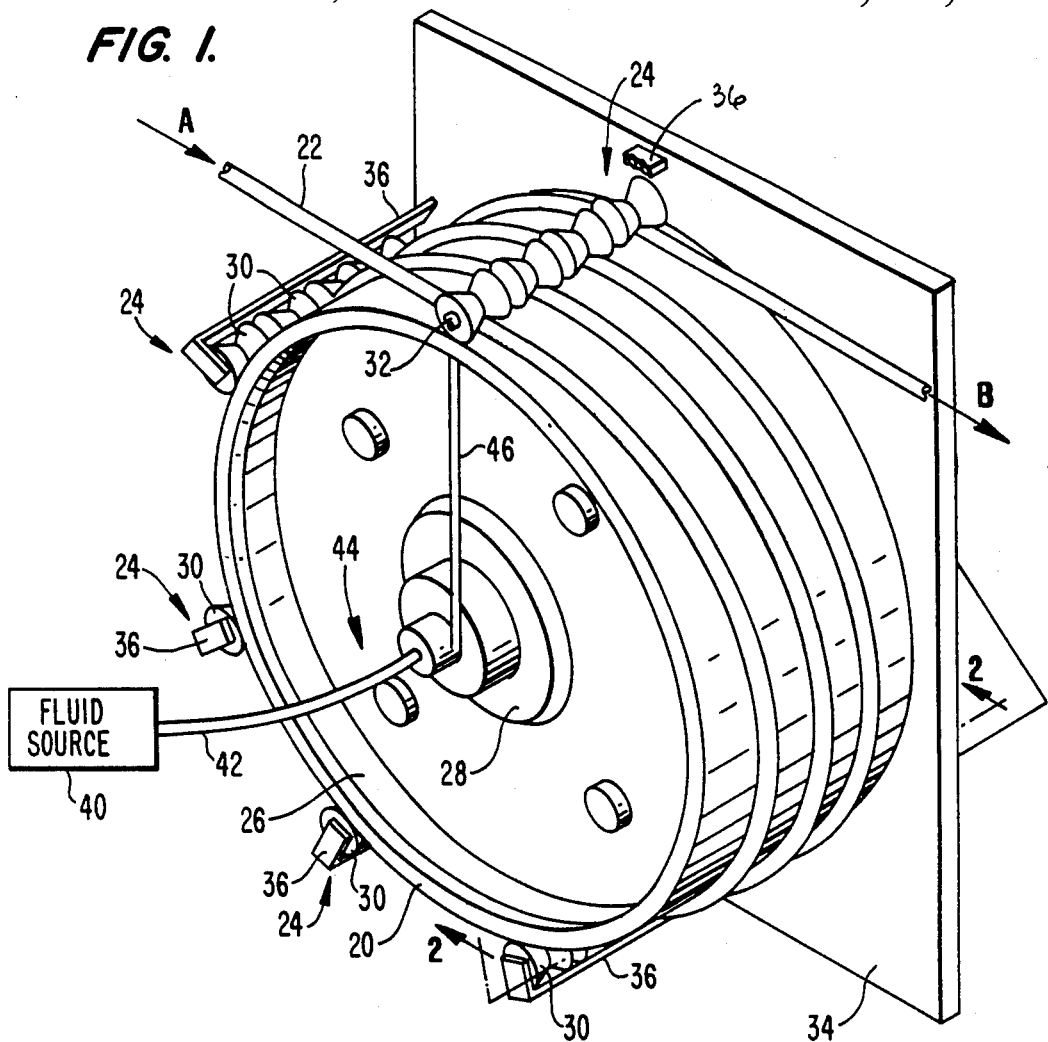
FIG. 1 is a perspective view of the cable drive system of the present invention.

FIG. 1 is a perspective view of the cable drive system of the present invention which includes an inflatable member 20 which acts as a variable diameter support means for supporting a cable 22 which is to be deployed or retrieved. For purposes of illustration, it can be considered that the cable 22 is being retrieved in the direction of arrow A in FIG. 1 and that the retrieved cable 22 is being provided for storage in the direction of arrow B of FIG. 1. That is, when the cable 22 is retrieved (e.g., for storage on a ship), the cable 22 may be stored on a drum (not shown) which is driven at a sufficient rate to wrap the cable 22 on the drum. Alternately, the cable 22 may be stored in a static area such as a "chain locker", provided steps are taken to prevent kinking or tangling of the cable 22.

Plural sets of rollers 24 form a guide means for guiding the cable 22 to maintain the cable 22 substantially in contact with the inflatable member 20, and to cause the cable 22 to be wound helically about the inflatable member 20. The inflatable member 20 is supported on a wheel or rim 26 which is driven by a rotating power source 28. The rotating power source 28 may be any type of rotating power source, for example, an electric motor, a hydraulic motor or a pneumatic motor. The inflatable member 20 may be similar to an automobile tire and may or may not incorporate a tread pattern. For example, in certain environments, it may be desirable that the inflatable member 20 have a tread pattern for water removal purposes, while other applications might dictate that the inflatable member 20 be smooth with no tread design (i.e., similar to an automobile racing slick). The inflatable member 20 is preferably made of rubber, and the composition may be varied in accordance with durability considerations or the desired coefficient of friction. For example, steel belts or fiberglass may be incorporated in the inflatable member 20. Typically, the diameter of the inflatable member 20 will be from 20 inches to 4 feet, although the particular diameter to be employed will be dictated by the type of cable to be driven.

In the preferred embodiment, each set of rollers 24 includes plural grooved rollers 30 which are mounted on a shaft 32 which is in turn mounted on a drive support structure 34 and a roller support structure 36. Spacers 38 (FIG. 2) are mounted on each shaft 32 between the rollers 30 so as to space the rollers 30 in a predetermined manner, thereby causing the cable 22 to travel in a helical path about the inflatable member 20.

Fluid pressure is applied to the inflatable member 20 via a fluid source 40 (hydraulic or pneumatic), a fluid supply conduit 42, a rotating coupling 44 and a fluid supply conduit 46. The fluid source 40, rotating coupling 44 and fluid supply conduits 42 and 46 form a means for inflating and deflating the inflatable member 20 to vary the force with which the cable 22 is held between the rollers 30 and the inflatable member 20. Therefore, fluid pressure (i.e., hydraulic or pneumatic pressure) is applied to the inflatable member 20 to adjust the diameter of the inflatable member 20, thereby controlling the normal force applied to the cable 22 to suit the requirements of the portion of the cable 22 which is being driven. Thus, the fluid pressure is varied to inflate or deflate the inflatable member 20 in accordance with the desired normal force.

Figure 2:
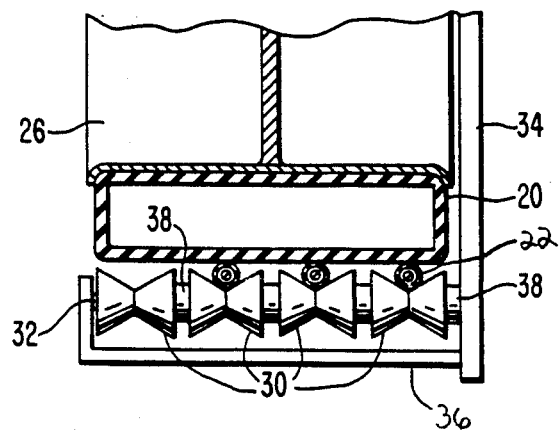
FIG. 2 is a cross-sectional view, taken along line 2—2 in FIG. 1, of an alternate embodiment of the cable drive system of the present invention, in which the inflatable member 20 is an innertube-type inflatable member.

As indicated above, the inflatable member 20 may be a conventional automobile tire of tubeless design which seals against the rim or wheel 26. FIG. 2 is a cross-sectional view of an alternate embodiment of the present invention in which the inflatable member 20 is an enclosed inflatable member 20 (similar to an innertube) which is supported on the wheel or rim 26.

Figure 3A:
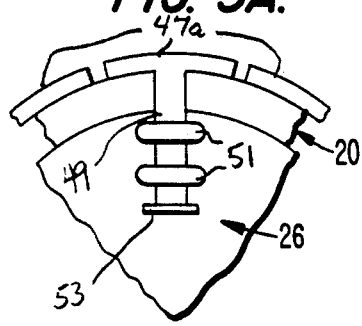
FIGS. 3A–3C are partial side views of alternate embodiments of the cable drive system of the present invention, in which rigid segments are mounted on the periphery of the inflatable member 20.
Figure 3B:
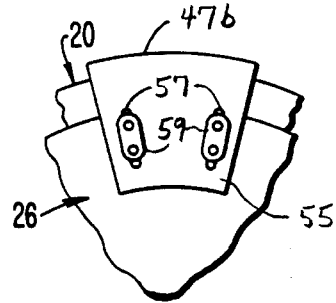
Figure 3C:
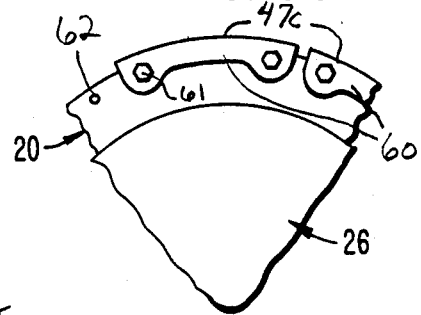

FIGS. 3A–3C illustrate alternate embodiments of the present invention in which rigid segments 47a, 47b, 47c are mounted about the periphery of the inflatable member 20. The rigid segments 47a, 47b and 47c may be made of a variety of materials to adjust, vary or improve functional characteristics (e.g., to provide different amounts of friction in the circumferential and axial directions) or wear characteristics. In addition, the rigid segments 47a, 47b, 47c may be used to eliminate or improve electromagnetic fields in the vicinity of the cable or to protect the inflatable member 20 when an abrasive cable 22 (e.g., a frayed wire rope) is to be driven.

In the embodiment of FIG. 3A, segments 47a have legs 49 (only one of which is shown in FIG. 3A) which extend through guides 51 which are mounted on the wheel 26. Feet 53 extend from the bottoms of the legs 49 to prevent the segments 47a from being detached from the wheel 26. However, the segments 47a are free to move radially to accommodate for inflation and deflation of the inflatable member 20, and the drive force is transmitted to the cable 22 by the segments 47a via the wheel 46.

In the embodiment of FIG. 3B, the segments 47b have flanges 55 with slots 57 therein. Pins 59 extend through the slots 57 and are fixed to the wheel 26. The segments 47b are free to move radially to accommodate for inflation and deflation of the inflatable member 20.

In the embodiment of FIG. 3C, the rigid segments 47c have flanges 60 which are bolted to the inflatable member 20 via bolts 61. In this embodiment, the inflatable member 20 is provided with recesses 62 which do not extend completely through the tread of the inflatable member 20, in which the bolts 61 are secured. Alternatively, the segments 47c may be secured to the inflatable member 20 by adhesive, molded-in pins, etc.

Figure 3D:
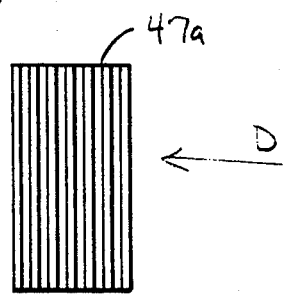
FIG. 3D is a plan view of one of the rigid segments of FIGS. 3A–3C.

FIG. 3D is a top view of one of the segments 47a of FIG. 3A and illustrates that the segments 47a are ribbed so that greater friction is provided in the drive direction (i.e., the direction of arrow D in FIG. 3D) to prevent the cable from sliding in the drive direction. The cable 22 is capable of sliding axially (i.e., in the directions perpendicular to the arrow D) so that the cable 22 will not rotate or twist Rigid segments 47b and 47c may have a design similar to that shown in FIG. 3D for segments 47a.

Figure 4:
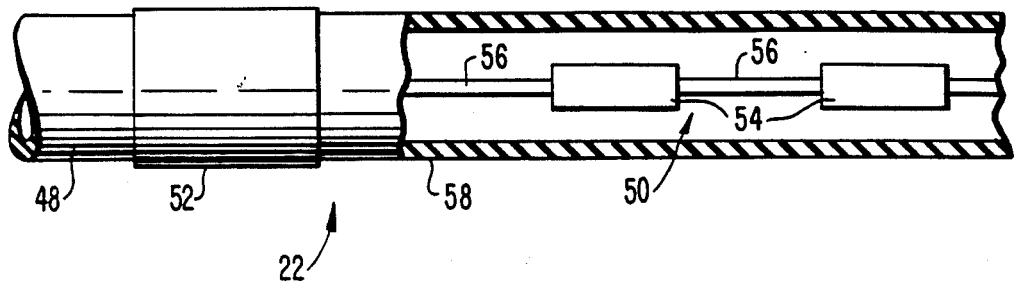
FIG. 4 is a side view, partially in cross-section, of a portion of a cable of the type which can be driven by the cable drive system of the present invention.

FIG. 4 is a side view of a cable 22 which is particularly suited to be driven by the cable drive system of the present invention which is capable of varying the normal force applied to the cable 22. It should be understood that the term "cable" is being used herein to describe any type of elongated member which must be driven (i.e., wound and unwound or retrieved and deployed). For example, the term "cable" is used herein to describe an elongated member formed by coupling heavy wire cable, fragile electrical circuits enclosed within hoses, antennas, arrays, etc. As illustrated in FIG. 4, cable 22 may include a portion of heavy wire cable 48 coupled to fragile electronic equipment 50 via a coupling 52. The fragile electronic equipment 50 may include small electronic cans 54 which are electrically connected by wiring 56 to the heavy wire cable 48. The fragile electronic equipment is positioned within a hose 58 which may be made of rubber or vinyl. As described in the Background of the Invention section above, available systems for driving cables of the type illustrated in FIG. 4 have tended to damage the fragile electronic equipment 50 or to damage the cable 22 at the interfaces between the coupling 52 and the hose 58 and the heavy wire cable 48. The cable drive system of the present invention makes it possible for the normal force on various portions of the cable 22 to be controllably varied, so as to reduce the possibility of damage to the cable 22, while maintaining the frictional drive force necessary to deploy or retrieve the cable 22.

Figure 5:
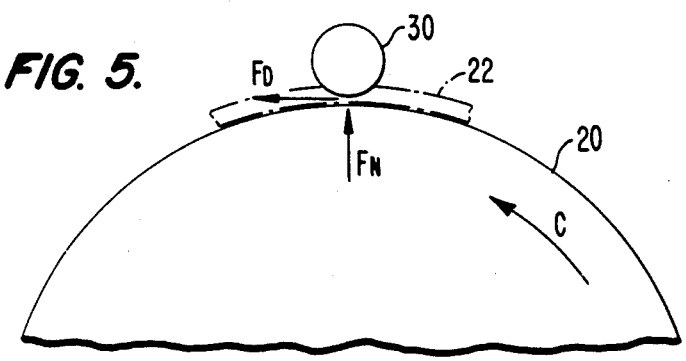
FIG. 5 is a diagram for illustrating the normal force and the frictional drive force applied to the cable in the drive system of the present invention.

As illustrated by the diagram of FIG. 5, the frictional drive force on a portion of a cable 22 which is between a roller 30 and the inflatable member 20, is in the direction of the arrow $F_D$ in FIG. 5 (i.e., tangent to the inflatable member 20) when the inflatable member 20 is rotating in the direction of arrow C, while the normal force is in the direction of the arrow $F_N$ (i.e., normal to the inflatable member 20 and the frictional drive force $F_D$). The present invention takes advantage of the fact that the frictional drive force $F_D$ is equal to the product of the coefficient of friction ($\mu_f$) and the normal force ($F_N$). Thus, by varying the normal force ($F_N$) by inflating or deflating the inflatable member 20, the frictional drive force ($F_D$) may be varied in dependence upon a number of factors including the drag on the cable 22, the fragile nature of the portion of the cable to be driven, etc. In addition, the frictional drive force $F_D$ can be maintained constant by varying the normal force $F_N$ when the coefficient of friction ($\mu_f$) varies due to, for example, variations in the cable material or environmental conditions. This can be a particular problem when oil is present on the cable, because a coating of oil on the cable will cause the coefficient of friction to decrease. By employing the cable drive system of the present invention, the normal force can be increased to maintain the desired frictional drive force. In the alternate embodiments of FIGS. 3A and 3B the drive force $F_D$ is transmitted from the wheel 26 to the segments (47a, 47b), while the inflatable member 20 provides the normal force. In the case of the embodiment of FIG. 3C, both the drive force $F_D$ and the normal force $F_N$ are transmitted through the inflatable member 20.

In an alternate embodiment, the roller shafts 32 may be mounted in adjustable brackets so that the rollers 30 can be moved towards and away from the inflatable member 20 to provide a coarse adjustment of the normal force in dependence upon cable size. Of course, fine adjustment of the normal force is always provided by the inflation and deflation of the inflatable member 20.

As indicated above, the frictional drive force used to deploy or retrieve the cable 22 is provided by the frictional drive force $F_D$ which is developed by the normal force $F_N$ provided by the squeezing of the cable 22 between the rollers 30 and the inflatable member 20 in a manner similar to a pinch roller drive. If there is a tension in the cable 22 opposing the drive direction (e.g., the tension caused by a drag load) the frictional drive force acts as a tailing force permitting a capstan effect to be developed to assist the drive of the cable 22 between the inflatable member 20 and the roller 30. The capstan effect is the effect caused when approximately 3 coils of cable are wound about a drum with a high tension force on one end of the cable and a relatively low tension force on the opposite end of the cable. In this capstan-type arrangement, the relatively low tension force is capable of driving the cable which is under the high tension force.

The cable drive system of the present invention may be implemented in numerous ways and is capable of handling a range of cable diameters. Examples of cable sizes which might be driven by the cable drive system of the present invention are cables from one inch to three inches in diameter. Thus, the cable drive system of the present invention can be designed in a variety of sizes and may be oriented horizontally or vertically depending on the available space and the size of the cable to be driven. Although the preferred embodiment of the present invention has been described as including an inflatable member 20, any type of variable diameter support means may be used to controllably vary the normal force applied to the cable 22. In addition, any suitable means may be used for rotating the variable diameter support means. Further, the cable drive system of the present invention could be coupled to circuitry for automatically controlling the inflation and deflation of the inflatable member 20, so that the appropriate normal force is automatically provided for driving the cable 22. For example, microprocessor circuitry could be employed in conjunction with a predetermined program (designed for a particular cable 22) for controlling the normal force applied to the cable 22 during the entire deployment or retrieval of the cable 22. Finally, sensors could be employed in conjunction with the electronic circuitry to provide feedback signals which could be processed to generate appropriate control signals for controlling the inflation and deflation of the inflatable member 20.

The cable drive system of the present invention has a number of advantages in that it is capable of preventing damage to cable/coupling interfaces and fragile electronic components of the type which are contained in many cables, including towed arrays. Flexing of the cable at the interfaces between couplings and cable is reduced since the coupling is depressed into the inflatable member 20. That is, as each rigid coupling passes between a roller 30 and the inflatable member 20, it is deflected into the inflatable member 20, thereby reducing the bending stress at the interface. The cable drive system of the present invention also overcomes the problem of cold flow of the cable 22 while the cable 22 is held stationary in the cable drive system for an extended period of time. That is, if the cable 22 is to be left in the cable drive system for an extended period of time, the inflatable member 20 can be deflated to provide only the normal force necessary to maintain the cable 22 in position, thereby avoiding the problem of cold flow. In addition, the cable drive system of the present invention is capable of accommodating for frictional variations due to the use of different cable materials or due to changes in the coefficient of friction caused by the environment (e.g., when oil coats the cable, the coefficient of friction will decrease, thereby making it necessary to increase the normal force in order to maintain the frictional drive force at the desired level). The cable drive system of the present invention is also capable of accommodating changes in outboard tension (i.e., drag).

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A cable drive system comprising:
    variable diameter support means for supporting a portion of a cable to be driven;
    guide means for guiding the cable so that the portion of the cable is maintained substantially in contact with said variable diameter support means and so that the portion of the cable is wound helically about said variable diameter support means and so that the portion of the cable is wound helically about said variable diameter support means, said variable diameter support means and said guide means applying a normal force to the portion of the cable which is substantially in contact with said variable diameter support means; and
    means for varying the diameter of said variable diameter support means while the cable is being driven, so as to controllably vary the normal force applied to the portion of the cable supported by said variable diameter support means during operation of said cable drive system.

2. A cable drive system according to claim 1, wherein said variable diameter support means comprises an inflatable member.

3. A cable drive system according to claim 2, wherein said means for varying the diameter of said variable diameter support means comprises means for inflating and deflating said inflatable member to vary the normal force which is applied to the cable.

4. A cable drive system according to claim 3, wherein said inflating and deflating means comprises fluid supply means.

5. A cable drive system according to claim 4, wherein said fluid supply means comprises pneumatic supply means.

6. A cable drive system according to claim 4, wherein said fluid supply means comprises hydraulic supply means.

7. A cable drive system according to claim 1, wherein said variable diameter support means comprises:
    a rotatable wheel; and
    an inflatable member supported on said rotatable wheel.

8. A cable drive system according to claim 7, wherein said means for varying the diameter of said variable diameter support means comprises means for inflating and deflating said inflatable member to vary the normal force which is applied to the cable.

9. A cable drive system according to claim 8, wherein said inflating and deflating means comprises:
    a fluid source;
    a rotating coupling mounted on said wheel and coupled to said fluid source; and
    a fluid supply conduit connected between said rotating coupling and said inflatable member.

10. A cable drive system according to claim 9, further comprising means for rotating said wheel.

11. A cable drive system according to claim 9, wherein said inflatable member is made of rubber.

12. A cable drive system according to claim 11, wherein said rubber inflatable member has a tread design thereon for the removal of water.

13. A cable drive system according to claim 7, wherein said guide means comprises a plurality of sets of rollers positioned about the periphery of said inflatable member.

14. A cable drive system according to claim 13, wherein each of said sets of rollers includes:
    a shaft; and
    a plurality of grooved rollers mounted on the shaft so as to hold the cable between the groove of the grooved rollers and said inflatable member, and to guide the cable so that it is wound helically about said inflatable member.

15. A cable drive system according to claim 7, wherein said variable diameter support means further comprises a plurality of rigid segments positioned about the periphery of said inflatable member, said rigid segments supporting the cable to be driven.

16. A cable drive system according to claim 15, wherein said variable diameter support means further comprises means for securing said rigid segments to said rotatable wheel.

17. A cable drive system according to claim 15, wherein said rigid segments are secured to said inflatable member.

18. A cable drive system according to claim 7, wherein said variable diameter support means further comprises a plurality of rigid segments positioned about the periphery of said inflatable member, wherein said rigid segments support the cable to be driven, protect said inflatable member and provide improved electromagnetic characteristics adjacent said cable.

19. A cable drive system according to claim 18, wherein said variable diameter support means further comprises means for securing said rigid segments to said rotatable wheel.

20. A cable drive system according to claim 18, wherein said rigid segments are secured to said inflatable member.

21. A cable drive system comprising:
    an inflatable member;

means for guiding the cable so that a portion of the cable is maintained substantially in contact with said inflatable member and so that the portion of the cable is wound helically about said inflatable member, said inflatable member and said guiding means applying a normal force to the portion of the cable which is substantially in contact with said inflatable member; and means for inflating and deflating said inflatable member while the cable is being driven, so as to controllably vary the normal force applied to the cable during operation of said cable drive system.

22. A cable drive system according to claim 21, wherein said inflating and deflating means comprises fluid supply means.

23. A cable drive system according to claim 21, further comprising means for rotating said inflatable member so as to drive the cable.

24. A cable drive system for a a towed array having a cable with first and second portions coupled by a coupling, comprising:

an inflatable member;

guide means for guiding the able so that a portion of the cable is maintained substantially in contact with said inflatable member and so that portion of the cable is wound helically about said inflatable member, said inflatable member and said guide means applying a normal force to the portion of the cable which is substantially in contact with said inflatable member; and means for inflating and deflating said inflatable member so as to controllably vary the normal force applied to the cable while the cable is being driven, so that the normal force applied to the second portion of the cable when the second portion of the cable is in contact with said inflatable member is controlled to be different from the normal force applied to the first portion of the cable when the first portion of the cable is in contact with said inflatable member.

25. A cable drive system according to claim 24, further comprising means for rotating said inflatable member so as to drive the cable.

26. A cable drive system according to claim 25, wherein said inflating and deflating means comprises fluid supply means.

27. A cable drive system comprising:

variable diameter support means for supporting a cable to be driven;

guide means for guiding the cable so that it is maintained substantially in contact with said variable diameter support means, said variable diameter support means and said guide means applying a normal force to the cable; and means for varying the diameter of said variable diameter support means so as to controllably vary the normal force applied to the cable, said variable diameter support means including:

a rotatable wheel; and an inflatable member supported on said rotatable wheel, said guide means including a plurality of sets of rollers positioned about the periphery of said inflatable member, each of said sets of rollers including:

a shaft; and a plurality of grooves rollers mounted on the shaft so as to hold the cable between the groove of the grooves rollers and said inflatable member, and to guide the cable so that it is wound helically about said inflatable member.

* * * * *